United States Patent Office 2,839,541
Patented June 17, 1958

2,839,541

PHENOLS FROM AROMATIC KETONES

Donna Stevens and Guy H. Harris, Concord, and Marshall B. Pearlman, Los Angeles, Calif., assignors to The Dow Chemical Company, Midland, Mich., a corporation of Delaware No Drawing. Application December 2, 1955
Serial No. 550,793

9 Claims. (Cl. 260—383)

This invention relates to a method of making phenolic compounds from certain aromatic ketones.

The fact that cupric compounds can aid in the conversion of aromatic carboxylic acids to phenols has been taught in the copending applications of R. D. Barnard and R. H. Meyer, Serial No. 403,074; W. W. Kaeding, R. O. Lindblom and R. G. Temple, Serial No. 403,064, now U. S. Patent No. 2,727,926; M. B. Pearlman, Serial No. 403,049, now U. S. Patent No. 2,727,924; and M. B. Pearlman, Serial No. 403,050, now U. S. Patent No. 2,764,587, all filed on January 8, 1954.

The present invention is based on the discovery that phenolic compounds can be produced from certain non-carboxyl compounds by reaction with cupric compounds. More specifically, it has been found that water-soluble cupric salts react in the presence of water at temperatures from 200° to 400° C. with certain aromatic ketones to form phenols. The ketones which have newly been found useful contain at least one and not over two carbonyl groups extending between a benzene ring and another carbon atom; and, they have at least one unsubstituted position on a benzene ring adajacent to the point of attachment of a carbonyl group. Any non-carbonyl substituents in the compound do not interfere with the desired action of cupric ions, though they may be altered or removed during the reaction.

Examples of aromatic ketones useful in the present process include.

Benzophenone
2,4-dichlorobenzophenone
2-nitrobenzophenone
4-methyl benzophenone
4-methoxy benzophenone
2-chloro-4'-nitro benzophenone
Acetophenone and its halo, alkyl, alkoxy and nitro substitution products
Propiophenone and its similar substitution products
Butyrophenone
Octanophenone
Fluorenone
Anthraquinone
Acridone
Benzil According to the invention, any such aromatic ketone is heated, under sufficient pressure to maintain it in a liquid state, to a temperature in the range from 200° to 400° C., in contact with water or water vapor and a cupric salt. The extent of the reaction, in batch operation, depends upon the contact time and temperature employed and the amount of cupric salt present at any time relative to the amount of ketone in contact therewith. For substantially complete batch reaction, there should be at least one mol of cupric salt for each carbonyl equivalent weight of the ketone in the reaction zone at one time, e. g., two mols of cupric ion per mol of such diketones as benzil or anthraquinone. Lesser proportions of cupric salt may be used, but the conversion to phenols will not be complete. The reaction usually is accompanied by the formation of metallic copper as the reaction approaches completion, unless the copper compound is restored occasionally to the cupric condition by introduction of gaseous oxygen. Such a procedure readily lends itself to prolonged or continuous operation, and, in such a case, the ratio of cupric salt to ketone present becomes unimportant because the copper compound can be restored to the useful cupric state as soon as it is reduced, and, in the course of time it has an infinite capacity for converting the aromatic ketones to phenols.

Upon termination of the reaction, the phenolic compounds may be recovered by extraction or steam distillation from the reaction mixture.

The cupric compound employed may be the cupric salt of a strong mineral acid, such as cupric sulfate or chloride, or it may be a cupric salt of an organic acid. It is most conveniently and economically supplied initially as cupric sulfate or other salt which is soluble in water.

Tests have shown cupric salts to be unique in their effect on the conversion of aromatic ketones to phenols, since the salts of aluminum, cadminum, cobalt, chromium, iron, lead, manganese, mercury, potassium, silver, tin and zinc produce no such effect. It has also been found that the effect of the cupric compound is augmented by the presence of a salt or oxide (hydroxide) of lithium, sodium, potassium, magnesium, barium or cobalt, but that these agents have no effect unless the cupric compound is present.

In the following examples, the identified aromatic ketone was sealed in a glass tube with the indicated molar proportion of cupric sulfate and with from 10 to 20 times its weight of water. The tube was heated to the indicated temperature for from 1 to 2 hours, then was cooled, opened, and emptied. The products were recovered by extraction or by steam distillation, and were identified.

| Ketone | Moles | Moles CuSO₄ | Temp., °C. | Products |
|---|---|---|---|---|
| Benzophenone | 1 | 1 | 240 | 2-hydroxybenzophenone. 3-hydroxybenzophenone. 4-hydroxybenzophenone. |
| Acetophenone | 1 | 1 | 240 | phenol. |
| p-Methoxyacetophenone | 1 | 1 | 240 | phenol, resorcinol. |
| Do | 1 | 1 | 225 | Do. |
| Fluorenone | 1 | 1 | 240 | 1-hydroxy fluorenone, also 2-, 3-, and 4-hydroxy. |
| Anthraquinone | 1 | 2 | 300 | 1-hydroxy anthraquinone. |
| Benzil | 1 | 2 | 240 | phenol and benzophenone. |
| Acridone | 1 | 1 | 240 | 1-hydroxy acridone. |

In like manner, chloro- or bromo-aromatic ketones give halophenolic compounds. Thus, one product from 4,4'-dichlorobenzil is m-chlorophenol. Similarly, a product from p-nitropropiophenone is m-nitrophenol. Likewise, 5-tertiary-butyl benzophenone gives principally 2-hydroxy-5-tertiarybutyl benzophenone.

It is noted that when the reagent ketone is one in which the carbonyl group is part of a ring structure, as in fluorenone, anthraquinone and acridone compounds, the carbonyl group usually appears in the phenolic product. When, however, the reagent ketone is an alkyl aryl ketone, the alkyl group and the carbonyl are lost, and the product is a simple phenol. If the ketone also contains a carboxyl substituent, one of the products is usually a dihydric phenol.

The method of the invention does not require superatmospheric pressure when operating on ketones which have boiling points above the reaction temperature.

With such high boiling materials, it is convenient to mix the ketone and cupric salt, heat the mixture to a reaction temperature at which the ketone remains liquid, and pass steam, or steam and air through the mixture.

We claim:

1. The method which comprises heating an aromatic ketone free from carboxyl groups in contact with a water-soluble cupric salt and water to a temperature from 200° to 400° C., and under sufficient pressure to maintain the ketone in a liquid condition, thereby to produce a phenolic compound, said ketone having at least one and not over two carbonyl groups extending between a benzene ring and another carbon atom, there being at least one unsubstituted position on a benzene ring adjacent to the point of attachment of the carbonyl group.

2. The method claimed in claim 1, wherein the aromatic ketone is a monoketone.

3. The method claimed in claim 1, wherein the aromatic ketone is benzophenone.

4. The method claimed in claim 1, wherein the aromatic ketone is an aliphatic acylophenone.

5. The method claimed in claim 1, wherein the aromatic ketone is acetophenone.

6. The method claimed in claim 1, wherein the aromatic ketone is p-methoxyacetophenone.

7. The method claimed in claim 1, wherein the aromatic ketone is a diketone.

8. The method claimed in claim 1, wherein the aromatic ketone is benzil.

9. The method claimed in claim 1, wherein the aromatic ketone is anthraquinone.

References Cited in the file of this patent

UNITED STATES PATENTS 2,727,924　　Pearlman　--------------　Dec. 10, 1955